United States Patent
Saibi et al.

(10) Patent No.: US 8,891,383 B2
(45) Date of Patent: Nov. 18, 2014

(54) HIGH-SPEED ETHERNET TRANSCEIVER CALIBRATION WITH ECHO CANCELLER REUSE

(75) Inventors: Fadi Saibi, Sunnyvale, CA (US); Hossein Sedarat, San Jose, CA (US); Ramin Farjadrad, San Jose, CA (US)

(73) Assignee: Aquantia Corp., Milpitas, CA (US)

( * ) Notice: Subject to any disclaimer, the term of this patent is extended or adjusted under 35 U.S.C. 154(b) by 526 days.

(21) Appl. No.: 13/171,380

(22) Filed: Jun. 28, 2011

(65) Prior Publication Data
US 2011/0317564 A1    Dec. 29, 2011

Related U.S. Application Data

(60) Provisional application No. 61/359,577, filed on Jun. 29, 2010.

(51) Int. Cl.
| | | |
|---|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl.
CPC .......... *H04L 12/2697* (2013.01); *H04L 43/50* (2013.01)
USPC .......................................... 370/249; 370/389

(58) Field of Classification Search
USPC ................................. 370/249, 389
See application file for complete search history.

(56) References Cited

U.S. PATENT DOCUMENTS

2004/0170164 A1* 9/2004 LeBlanc et al. ............... 370/389
2009/0010444 A1* 1/2009 Goldstein et al. ............... 381/66

* cited by examiner

*Primary Examiner* — Asad Nawaz
*Assistant Examiner* — Stephanie Chang
(74) *Attorney, Agent, or Firm* — Lance Kreisman; Peninsula Patent Group

(57) ABSTRACT

A method of operating a transceiver integrated circuit is disclosed. The method comprises generating test signals directed to testing one or more transceiver parameters. The test signals are transmitted from a digital domain to an analog domain along a transmit path, and looped-back from the transmit path to a receive path. Echo canceller circuitry coupled between the transmit path and the receive path is trained and generates a filtered output representing a metric indicative of the one or more transceiver parameters.

23 Claims, 6 Drawing Sheets

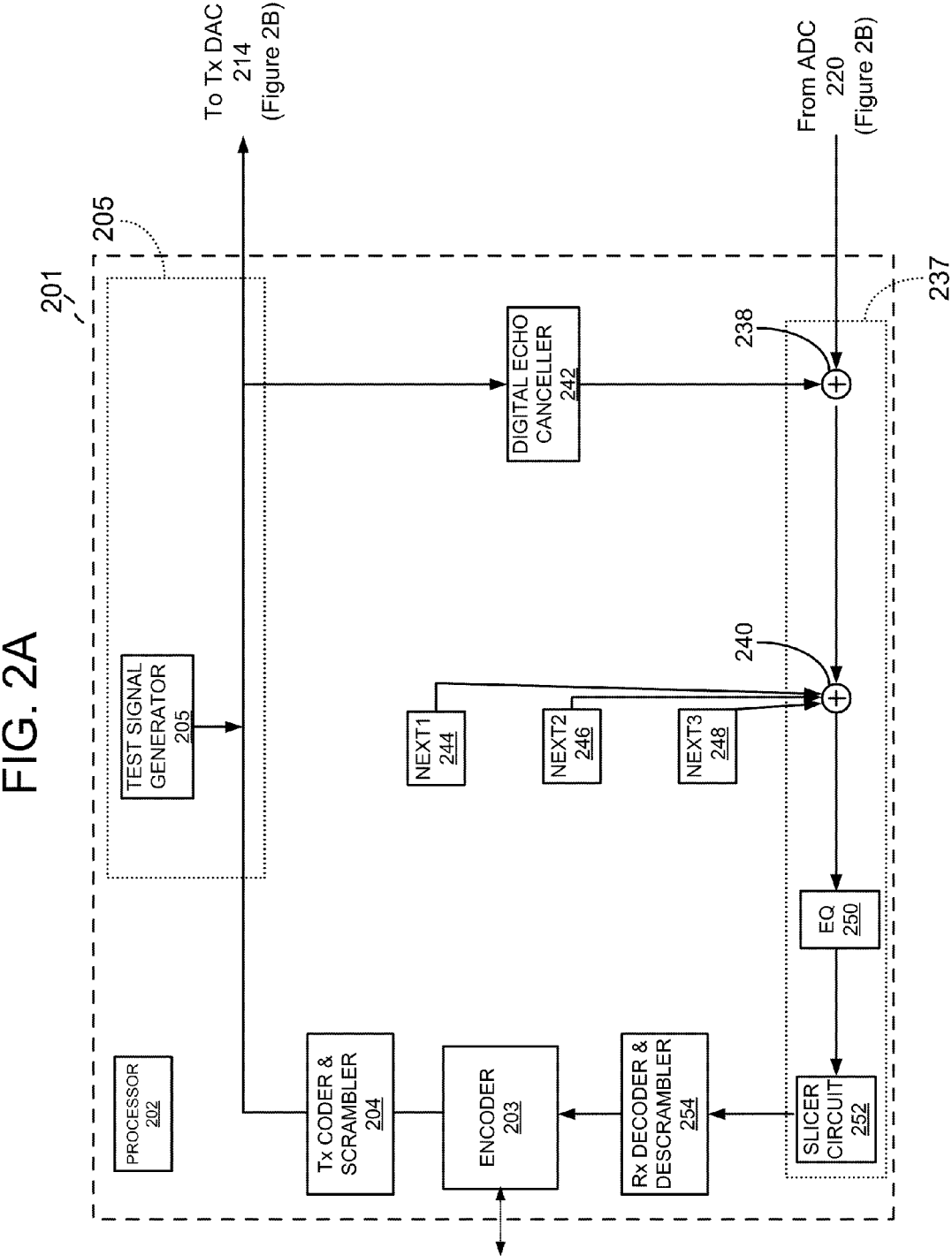

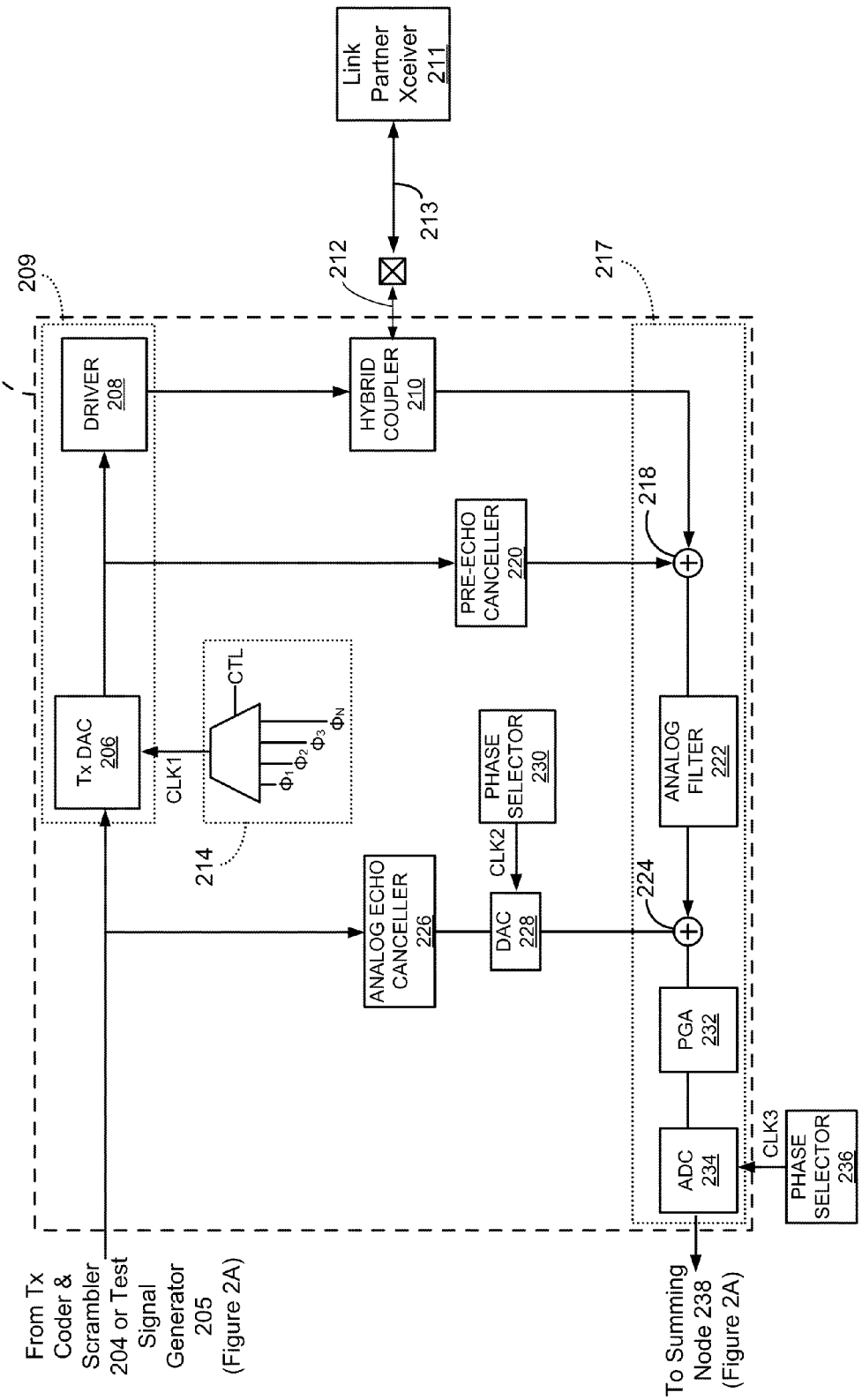

FIG. 5

HIGH-SPEED ETHERNET TRANSCEIVER CALIBRATION WITH ECHO CANCELLER REUSE

RELATED APPLICATIONS

This application claims the benefit of priority under 35 U.S.C. 119(e) to Provisional Application Ser. No. 61/359,577, filed Jun. 29, 2010, titled ANALOG FRONT-END AUTOMATED CALIBRATION AND SCREENING USING ECHO CANCELLERS, which is incorporated herein by reference in its entirety.

TECHNICAL FIELD

The disclosure herein relates to electronic communications, and more particularly to improving performance in high-speed wired electronic communications.

BACKGROUND

10 Gigabit Ethernet is an increasingly popular communication standard, with a nominal data rate of 10 Gbit/s. One form of 10 Gigabit Ethernet is IEEE 10GBASE-T, used to provide 10 gigabit per second connections over unshielded or shielded twisted pair copper wires. Each 10GBASE-T transceiver channel typically includes a transmit path and a receive path. As signals are transmitted, echos or reflections may result and propagate back along the transmit path, forming an "echo channel." Forward signal propagation occurs in what is often referred to as a "forward channel."

In a full-duplex system, the echo channel often depends on components external to the device that couple the analog transmit path to the analog receive path. Although transmit path high-frequency distortions are generally filtered out through the cable forward channel, this may not be the case through the echo channel. Thus, there may be a detrimental impact on local receive performance without impacting remote receiver performance, especially for long cable lengths.

Besides the echo channel performance noted above, there are many other parameters in a 10GBASE-T transceiver that need to operate near an optimal operating point in order to robustly transmit and detect data to and from the link. The optimal operating point is usually determined through an initial training process where a far-end transmitter sends a known training signal and a local receiver optimizes its own parameters using the training signal and a training method. Some of the transceiver parameters that benefit from training, or calibration, include transmit phase, analog-to-digital conversion parameters (such as gain matching, and offset cancellation/matching), driver parameters, transmit gain, and termination impedance, among other things. The training methods typically find the optimal receiver parameters by minimizing some measure of error. The error is usually identified as the difference of the known transmit data and the received data decoded by the receiver.

While initial training methods often work well for their intended applications, several transceiver operating parameters are analog in nature, and may be susceptible to PVT variations over time. PVT variations often undesirably affect transceiver performance. Unfortunately, known calibration methods for high-speed ethernet transceivers do not identify and/or compensate for PVT effects at both the chip characterization stage and in the field.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 2A illustrates a block diagram of one embodiment of the digital processing portion of the transceiver architecture of FIG. 1;

FIG. 2B illustrates a block diagram of one embodiment of the analog interface circuitry of FIG. 1;

DETAILED DESCRIPTION

Embodiments of a transceiver circuit and associated methods of operation are disclosed. In one embodiment, a method of operating a transceiver integrated circuit is disclosed. The method comprises generating test signals directed to testing one or more transceiver parameters. The test signals are transmitted from a digital domain to an analog domain along a transmit path, and looped-back from the transmit path to a receive path. Echo canceller circuitry coupled between the transmit path and the receive path is trained and generates an output representing a metric indicative of the quality of the selection of one or more transceiver parameters. In this manner, the digital processing circuitry of the transceiver can analyze signals coupled from the analog transmit path into the analog receive path to derive a performance measure consistent with device field operation.

In a further embodiment, a transceiver integrated circuit is disclosed. The transceiver integrated circuit comprises digital processing circuitry including a test signal generator to generate test signals directed to testing one or more transceiver parameters and a first echo canceller circuit. Analog interface circuitry couples to the digital processing circuitry and includes a transmit signal path and a receive path. The transmit path selectively couples to the test signal generator to transmit signals to an output pad. The receive path receives signals from the output pad. The transmit signal path and the receive signal path are selectively coupled during a calibration mode in a loopback path configuration, and the first echo canceller circuit generates a metric based on the test signals processing through the transmit and receive paths via the loopback path.

Figure 1:
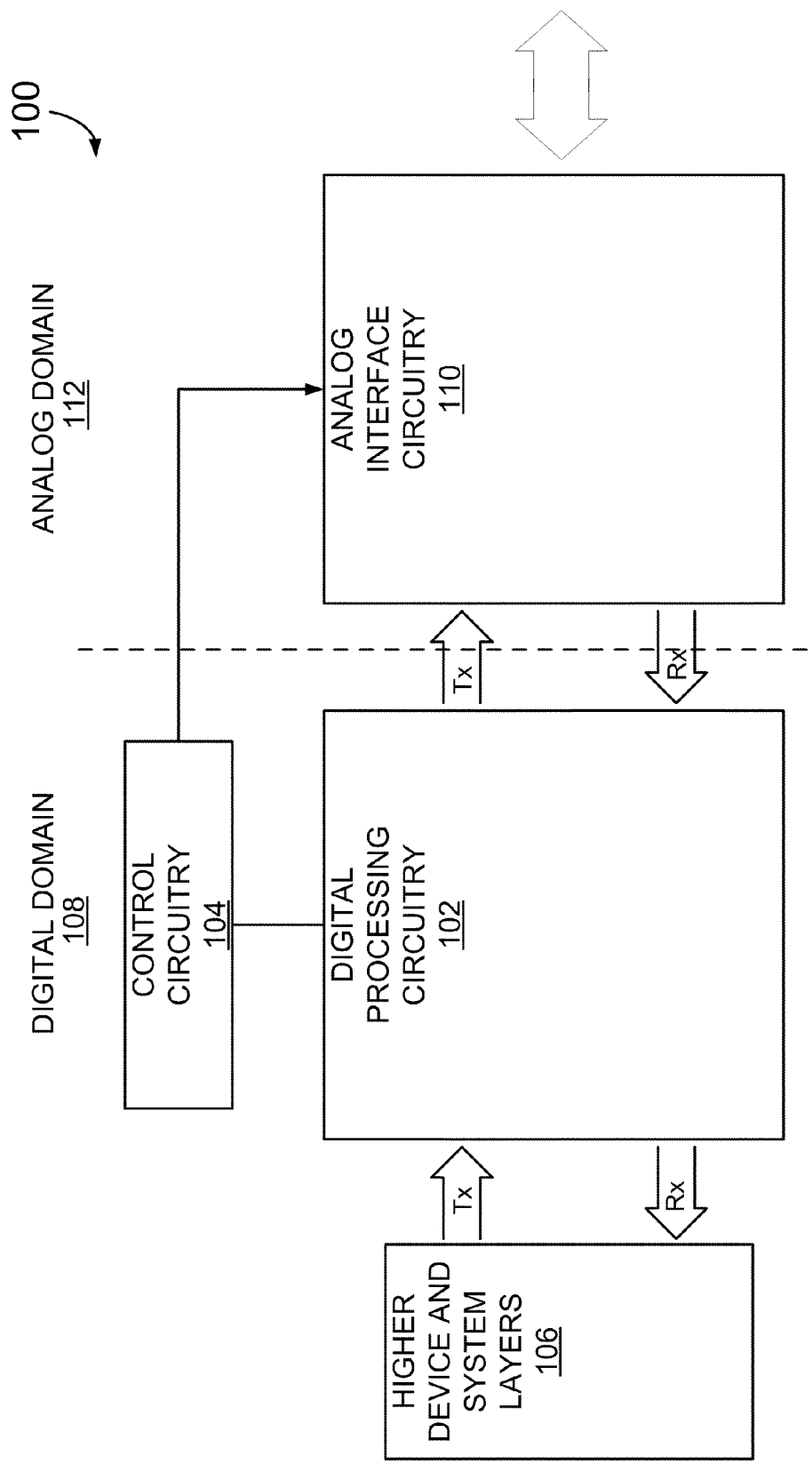
FIG. 1 illustrates a high-level transceiver architecture for the 10GBASE-T communication standard.

FIG. 1 is a block diagram illustrating one embodiment of a transceiver architecture for a high-speed ethernet transceiver 100. The transceiver architecture includes digital processing circuitry 102, associated control circuitry 104, and higher device and system layers 106 that handle signaling tasks in a digital domain 108. Analog interface circuitry 110 interfaces the digital processing circuitry 102 to the "physical world" and carries out respective signaling functions in an analog domain 112. Respective transmit Tx and receive Rx signaling paths route data between the digital and analog domains.

FIG. 2A is a block diagram illustrating further detail of one embodiment of the digital portion of the transceiver architecture of FIG. 1. This example is suitable for a 10GBASE-T standard, but other different configurations and types of transceiver components can be used in other embodiments for 10GBASE-T or for other, different communication standards. For explanatory purposes, the example shown in FIG. 2A illustrates a single transmitter path/channel and a single receiver path/channel for data. Multiple such paths/channels are provided in embodiments having multiple channels, e.g. four of the transmitter paths and the receiver data paths shown in FIG. 2A are used in the 10GBASE-T standard. To further aid in understanding the relative digital and analog components, the digital processing circuitry is enclosed in box 201 while the analog interface circuitry is enclosed by box 207.

Further referring to FIG. 2A, one embodiment of the transceiver 100 generally includes one or more processors 202 or connections to processors to control various operations for the transceiver components. Furthermore, additional hardware and/or software/firmware can be provided to implement the components themselves and can include processor functionality.

In a digital transmit portion 205 of the digital processing circuitry 201, transmit coding and scrambling circuitry 204 may be used to encode transmit data in a particular protocol, followed by self-synchronized data scrambling. The encoder includes a low density parity check (LDPC) encoder and a 128DSQ mapper (or other type of mapper) that uses a coset-partitioned constellation to map the data to symbols. Each 128-DSQ symbol is transmitted using two back-to-back PAM-16 signals (Pulse Amplitude Modulation, 16 levels). A Tomlinson-Harashima Precoding (THP) precoder can then adjust the signal to assist the far-end receiver in performing signal equalization. The scrambling provides clock transitions, a statistically random power spectrum for EMI (electromagnetic interference) control, and equalizer convergence, among other things.

The digital transmit path 205 in the digital processing circuitry 201 also employs a test signal generator 205 that selectively provides test patterns during a calibration mode to optimize various circuit parameters. The patterns may comprise sequences of signals that target certain portions of the transceiver, thereby stressing those portions in an effort to determine the optimal operating point.

Referring now to FIG. 2B, digital signals or symbols from the Tx coding/scrambling circuit 204 or test signal generator 205 are fed to the analog interface circuitry 207 where they are received by a transmit digital-to-analog converter (DAC) 206. The transmit DAC receives a clock signal CLK1 having a phase that defines a transmit phase for transmitted data. Phase selector logic 214 provides a way to adjust the phase during an initialization mode, as more fully discussed below. In one embodiment, the phase selection logic employs a multiplexer 215 that receives a plurality of clock signals at relative offset phases $\phi_1$-$\phi_N$ (clock phase increments), where N in one embodiment is 8, such that 8 offset selections are available. A control input CTL to the multiplexer 215 selects one from the plurality of phases depending on test conditions, as more fully described below regarding calibration operations. The transmit DAC 206 feeds a driver circuit 208, which converts the digital data to an analog form for transmission and transmits the data via a hybrid coupler and transformer block 210 to a physical channel 212. The transmit DAC 206 and driver 208 in one embodiment define an analog transmit path 209.

Further referring to FIG. 2B, transmit data from the hybrid coupler 210 is then sent out along physical media, such as an unshielded twisted pair cable 213, and the signals received by a link partner transceiver 211. Data transmitted from the link partner transceiver may propagate back along the transmission line for reception by an analog receive path portion 217 of the analog interface circuitry 207.

With continued reference to FIG. 2B, data from the link partner transceiver 211 is received at the hybrid coupler 210 and forwarded to a summing node 218 that also receives a filtered compensation signal from a pre-echo canceller 220. The pre-echo canceller connects to the output of the transmit DAC 206 along the analog transmit path 209 and generates a compensation signal to cancel echo between the transmit DAC 206 and the driver 208. The summing node 218 feeds an analog filter 222, where the receive data is further filtered, then passed on to a second signal summing node 224.

With further reference to FIG. 2B, similar to the pre-echo canceller 220 noted above, the analog receive path 217 further includes an analog echo canceller 226 that includes an input coupled to the analog transmit path just upstream of the transmit DAC 206. An echo DAC 228 is disposed between the analog echo canceller 226 and the second summing node 224. The echo DAC responds to a timing signal CLK2 having a selectable phase controlled by a phase selector 230. The phase selector may be constructed similarly to that described for the transmit DAC phase selector 214. In one embodiment, during a calibration mode, the analog echo canceller 226 and DAC 228 provides a loopback path between the transmit and receive paths for calibration purposes. The loopback functionality is discussed in further detail below.

Disposed at the output of the second summing node 224 is an amplifier such as a programmable gain amplifier PGA 232 for variable gain adjustments.

With continued reference to FIG. 2B, to transition the receive data from the analog domain to the digital domain, the analog receive path 217 incorporates an analog-to-digital converter (ADC) 234 that generates data samples from the received and processed analog waveforms. The ADC includes a clock input CLK3 that, similar to the DACs described above, has a phase selector circuit 236 to adjust the clock phase during a calibration mode.

Referring back to FIG. 2A, the receive path 217 continues into the digital domain along a digital receive path 237 by including further summing nodes 238 and 240 to receive compensation signals from a digital echo canceller 242, and a plurality of near end crosstalk cancellers (NEXT) 244, 246, and 248. An equalizer circuit 250 receives sampled signals from the summing node 240 and can include one or more equalizers to reduce inter-symbol interference (ISI) effects on the data. The output of the equalizer circuit 250 is fed to a slicer circuit 252 that makes a decision on the data based on the quality of the processed signals up to that point. As more fully described below, the accuracy in which the slicer circuit can make an accurate decision may be improved by taking into account calibration measurements from one or more of the echo cancellers.

The signal from the slicer circuit 252 can then be provided to decoding and descrambling circuitry 254 that includes a DSQ128 decoder that outputs decoded data to a framer. The framer extracts frames from the received data and provides the frames to an LDPC decoder. The LDPC decoder generally performs an error-correction process on the data. The data can then be provided to a descrambler which outputs de-scrambled data to the encoder/decoder 203 for decoding. The decoded signals are then fed to a connected computer system, processor, or other device.

Prior to operation in the field, the transceiver 100 undergoes a calibration or initialization routine to train and optimize various circuit parameters. Some of these parameters include various operating levels for the ADC 234, and operating points for the driver circuitry 208 including biasing currents and drive strength. Additional parameters include the impedance of the unshielded twisted pair line 213, aspects of the pre-echo canceller 220, and various filter parameters. While various parameters may be calibrated consistent with the principles described herein, detecting and adjusting the transmit DAC clock phase during the calibration procedure will be described in detail below.

Figure 3:
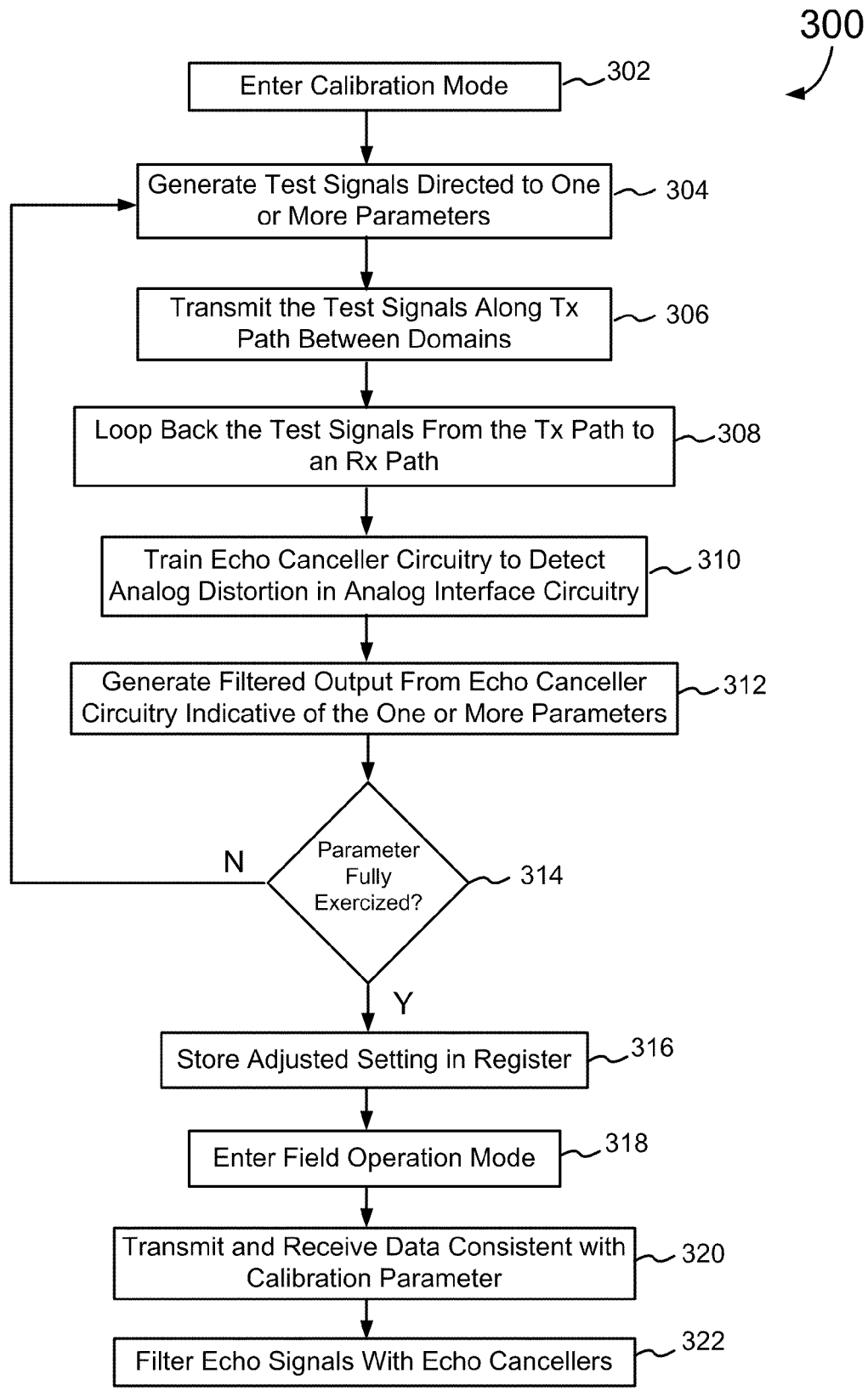
FIG. 3 is a flow diagram of one embodiment of a method of calibrating one or more parameters of the transceiver of FIG. 2.

Operation of the transceiver circuitry 100 described above for optimum calibration operations is generally set forth in the flowchart of FIG. 3. At a very high level, the method involves looping back test signals generated during a calibration mode between the analog transmit and receive paths to simulate an operating environment. Echo cancellation circuitry is then trained, or placed in an adaptation process to generate filtered signals representing noise and/or distortion on test signals transmitted and received along the loopback path. The filtered signals are then evaluated and parameter adjustments are made based on the signals to optimize the analog interface. Following calibration, the transceiver is placed in a normal duplex mode of operation, where the echo cancellation circuitry is reused as a filter to compensate for echo along, for example, the analog transmit path. Reusing the echo cancellation circuitry between normal duplex and calibration modes of operation provides an efficient and straightforward way to set optimum analog parameters for both chip characterization and in-field testing.

Referring now to FIG. 3, a more detailed discussion of a method, generally designated 300, consistent with that highlighted above, involves first placing the transceiver chip 100 in a calibration mode, at step 302. This is in contrast to a normal duplex mode of operation, and involves generating test patterns with the test signal generator 205 directed to one or more analog parameters of interest, at step 304. In one specific embodiment, the test signals may be directed to the transmit DAC 206, and more specifically, the transmit DAC clock phase. The test signals are transmitted along the transmit path between the digital processing circuitry (digital domain) and the analog interface circuitry (analog domain), at step 306. For the transmit DAC example, the clock phase is initially set to a first value (out of 8 possible values in one embodiment).

The transmitted test signals are looped back from the analog transmit path 209 to the analog receive path 217, at step 308. The looping back may take place along one or more loop back paths defined by the analog echo canceller 226, the pre-echo canceller 220, the link partner transceiver 211, or any other location that may be switched-in or otherwise established between the analog transmit and receive paths 209 and 217. The echo and NEXT canceller circuitry then undergoes adaptation or training, at step 310, to detect distortion or noise that directly relates to impairments during normal operation.

The noise and distortion samples from the filter adaptations form a filtered output, at step 312, that is indicative of the one or more parameters of interest—here, the transmit DAC clock phase. A measure or score is then determined from the noise samples associated with the particular clock phase at the decision point circuit, or slicer 252. The steps above are then repeated for each possible value of interest for the given parameter being tested. In the case of the transmit DAC clock phase, the steps are repeated 7 more times until all 8 clock phase selections (in one embodiment) are applied to the transmit DAC 206. If the parameter is not fully exercised, at step 314, another iteration occurs. If the parameter is fully exercised, then the best scoring parameter value is identified and stored in a register, at step 316.

With the parameter setting stored, further parameters may be tested, either sequentially or in parallel. Once the testing is complete, the transceiver 100 exits the calibration mode, and enters a field operation mode for normal duplex operation, at step 318. Normal duplex mode generally involves transmitting and receiving data consistent with the determined calibration parameters, at 320. The echo cancellers used in the calibration operation to generate the noise and distortion samples are then reused in the duplex mode to filter echo signals resulting along the analog transmit path.

Figure 4:
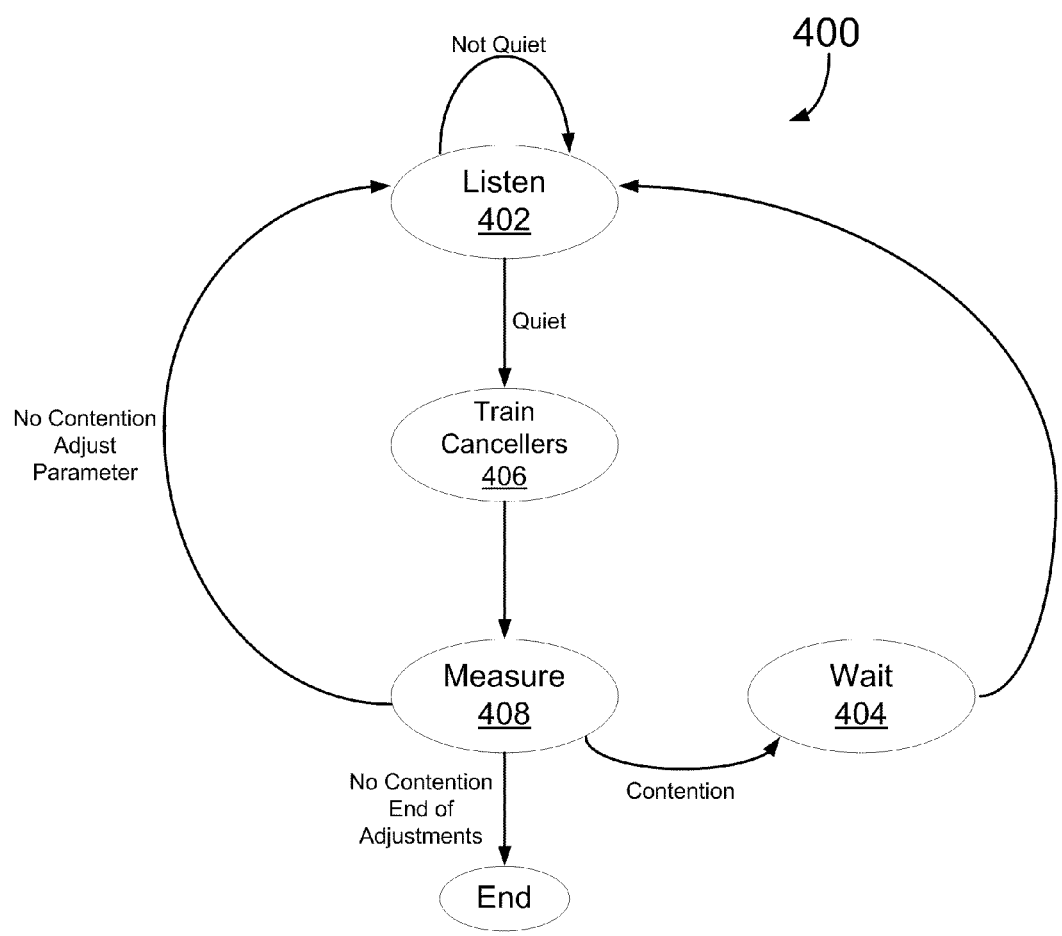
FIG. 4 illustrates a state machine that may be used in the transceiver architecture of FIG. 2 to minimize data contention to connected link partners during a calibration mode of operation.

In one embodiment, a state machine such as that shown in FIG. 4, and generally designated 400, minimizes contention due to test signals that could be simultaneously applied by link partner transceivers during duplex channel calibration operations in the field, as described above. By implementing such a state machine, calibration speed may be optimized to reduce link downtime. Generally, the state machine follows a looping algorithm that goes through each value of the analog parameter of interest (such as the transmit DAC phase described above). The algorithm begins with a listen state, at 402, where the transceiver passively listens to what is on the line, or channel (the unshielded twisted-pair cable). For each iteration of the overall loop, the listen state is maintained as long as the line is not quiet. When the line is deemed quiet, the transceiver moves to a "train cancellers" state, at 406, and subsequently to a "measure" state, at 408. In the measure state, filtered samples at a slicer or canceller impulse response information are processed to derive a value of the calibration quality metric of interest. A determination is also made as to whether contention between transmitted and received data occurred. If no contention occurred, the algorithm proceeds to the next iteration of the overall loop. The loop ends when all iterations have taken place. If contention did occur, then the state machine moves to the "wait" state. A wait state, at 404, is employed to provide a random amount of time for the transceiver to "wait" before entering the "listen" state 402.

In one embodiment, the measurement or score is determined through a process that establishes a decision point echo metric. A residual distortion signal may be regarded as a realization of a random source. Different statistical metrics may be computed using decision point signal observations through histogram or signal distribution feature estimates such as variance, mean absolute value, measures of kurtosis, and accumulated tail. Other metrics may involve autocorrelation results, and/or power spectral density. The metric(s) to be used for optimization may be selected based on the type of impairment to mitigate. For example, in the case of errors due to impulsive noise, a histogram tail may provide the most useful information. The histogram tail information may be gathered via a counter in the slicer that runs a count of decision point samples. In some embodiments, a decision point tail counter threshold may be set, where for a fixed number of decision point samples, those with magnitudes above a threshold are counted, thereby realizing a Bernoulli random variable. The setting with the smallest tail count is chosen during calibration, and may be stored in memory for use during normal operation.

In the specific case of a transmit DAC phase parameter, one assumption is that the transmit clock and the receive clock have the same frequency, but arbitrary phase. This may alter the effective time of flight or propagation delay for an impulse originating at the DSP transmitter and arriving at the DSP receiver. Viewed from the ADC 234, modifying the sampling phase of the Tx DAC clock CLK1 has an effect on performance as the analog transmit path distortion concentrates differently within a clock period. The distribution of the distortion generally depends on external components and reflection-inducing discontinuities.

Figure 5A:
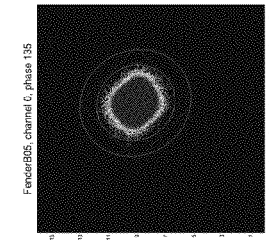
FIGS. 5A-5H illustrate decision point histogram performance as a function of transmit phase value for one application of the transceiver of FIG. 2B.
Figure 5B:
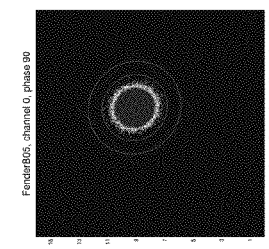
Figure 5C:
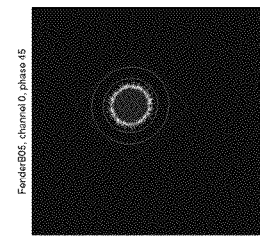
Figure 5D:
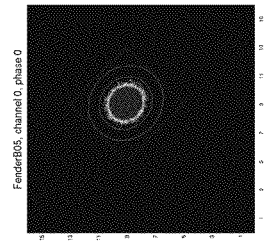
Figure 5E:
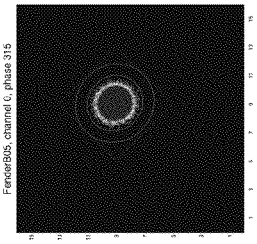
Figure 5F:
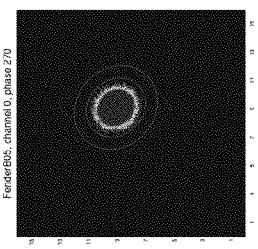
Figure 5G:
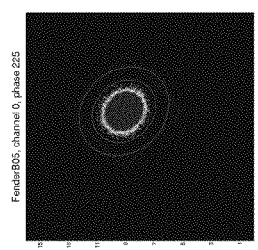
Figure 5H:
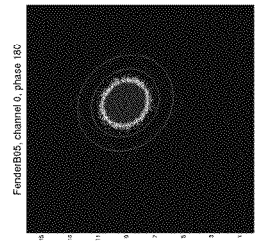

Referring now to FIGS. 5A-5H, two-dimensional saturated histograms that cumulatively illustrate tail counts are shown that correspond to the eight iterations of phase changes through the calibration method described above. FIG. 5A illustrates results utilizing a clock phase of 0°, FIG. 5B illustrating the histogram corresponding to a clock phase of 45°, FIG. 5C illustrating a histogram corresponding to a phase of 90°, and so forth every 45° until a phase of 315°, shown by the histogram of FIG. 5H. The histograms clearly show a performance dependency on transmit phase selection.

In a further embodiment, adaptation and training of the echo cancellers is enhanced by offsetting the clock phases for the clocks CLK1, CLK2, and CLK3, such that the DACs 206 and 228 and ADC 234 cooperate to allow the echo canceller adaptations to be interleaved, or time multiplexed. This allows for higher time domain resolution for loopback path impulse response measurements.

Those skilled in the art will appreciate the benefits and advantages afforded by the transceiver slicer circuitry and method described above. By reusing the echo cancellation circuitry during both full duplex and calibration modes of operation, the analog interface circuitry may be compensated in ways that enable a more robust decision to be made by the slicer, leading to better performance. Moreover, the calibration routines and apparatus described above may lend themselves well to automatic test equipment applications, where the generated metric(s) may be used to compare one transceiver chip to another, or employ thresholds for pass/fail decisions, or even compound the ATE testing with other stress test scenarios such as clock recovery sub-systems that can be artificially put under stress to improve test coverage.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operating a transceiver integrated circuit, the method comprising:
    generating test signals with the transceiver integrated circuit, the test signals directed to testing a transmit timing parameter;
    transmitting the test signals from a digital domain to an analog domain along a transmit path in the transceiver integrated circuit, the transmitting including driving the test signals in accordance with the transmit timing parameter;
    looping back the test signals from the transmit path to a receive path;
    training echo canceller circuitry coupled between the transmit path and the receive path; and
    generating an output from the trained echo canceller, the output comprising a metric indicative of the performance of the transmit timing parameter.

2. The method according to claim 1 and further comprising:
    adjusting the transmit timing parameter based on the generated metric.

3. The method according to claim 1 wherein the looping back comprises:
    looping back the test signals internal to the transceiver integrated circuit.

4. The method according to claim 1 wherein the looping back comprises:
    looping back the test signals external to the transceiver integrated circuit.

5. The method according to claim 1 wherein the looping back comprises:
    looping back at least a portion of the test signals along a first loopback path, and looping back at least a second portion of the test signals along a second loopback path.

6. The method according to claim 1 wherein training the echo canceller circuitry comprises:
    determining at least one impulse response.

7. The method according to claim 6 wherein training the echo canceller circuitry comprises:
generating a plurality of impulse responses from multiple echo cancellers; and
interleaving the plurality of impulse responses to generate an oversampled impulse response.

8. The method according to claim 1 wherein the output comprises a filtered output.

9. The method according to claim 1 wherein the output comprises an impulse response output.

10. A transceiver integrated circuit comprising:
digital processing circuitry including a test signal generator to generate test signals directed to testing a transmit timing parameter, the digital processing circuitry including a first echo canceller circuit;
analog interface circuitry coupled to the digital processing circuitry, the analog interface circuitry including
a transmit signal path selectively coupled to the test signal generator to transmit signals to an output pad, the transmitting including driving the test signals in accordance with the transmit timing parameter,
a receive path to receive signals from the output pad,
wherein the transmit signal path and the receive signal path are selectively coupled during a calibration mode in a loopback configuration, and
wherein the first echo canceller circuit generates a metric based on the test signals processing through the transmit and receive paths via the loopback path.

11. The transceiver integrated circuit according to claim 10 wherein the analog interface circuitry includes an analog echo cancellation circuit interposed between the transmit path and the receive path.

12. The transceiver integrated circuit according to claim 11 wherein analog echo cancellation circuit forms at least a portion of the loopback path.

13. The transceiver integrated circuit according to claim 10 wherein the output pad is adapted for coupling to one end of a transmission line, the transmission line having a far end coupled to a link partner transceiver.

14. The transceiver integrated circuit according to claim 13 wherein the transmission line and link partner transceiver form at least a portion of the loopback path.

15. The transceiver integrated circuit according to claim 10 and further comprising a conversion interface to convert the transmitted and received test signals between the digital and analog domains.

16. The transceiver integrated circuit according to claim 15 wherein the conversion interface comprises a plurality of conversion circuits having respective clock inputs.

17. The transceiver integrated circuit according to claim 16 and further including clock selection circuitry to change respective input clock phases.

18. The transceiver integrated circuit according to claim 17 wherein the clock selection circuitry includes oversampling logic.

19. The transceiver integrated circuit according to claim 10 wherein the metric is based on a nonlinear echo measurement.

20. The transceiver integrated circuit according to claim 19 wherein the nonlinear echo measurement comprises residual echo indicative of power or frequency content.

21. The transceiver integrated circuit according to claim 10 wherein the metric is based on a linear echo measurement.

22. The transceiver integrated circuit according to claim 10 embodied as a 10GBASE-T transceiver circuit.

23. An ethernet transceiver circuit comprising:
digital processing circuitry including a first echo canceller circuit;
analog interface circuitry coupled to the digital processing circuitry, the analog interface circuitry including
a transmit signal path to transmit signals to an output pad, the transmitting including driving the test signals in accordance with a transmit timing parameter,
a receive path to receive signals from the output pad,
wherein during a data transmit mode, the first echo canceller circuit filters echo signals received from along the transmit path; and
wherein during a calibration mode, the first echo canceller circuit filters looped-back test signals to generate a filtered output metric indicative of performance of the transmit timing parameter.

* * * * *